United States Patent
Gatten et al.

(10) Patent No.: US 12,422,277 B2
(45) Date of Patent: Sep. 23, 2025

(54) MAPPING

(71) Applicant: Zimeno Inc., Livermore, CA (US)

(72) Inventors: Benjamin Meier Gatten, Pleasanton, CA (US); Srikanth Gurram, Bangalore (IN); Sagar Kumar Sethi, Madhapur (IN); Sadasivudu Malladi, San Jose, CA (US)

(73) Assignee: Zimeno Inc., Livermore, CA (US)

( * ) Notice: Subject to any disclaimer, the term of this patent is extended or adjusted under 35 U.S.C. 154(b) by 118 days.

(21) Appl. No.: 18/523,834

(22) Filed: Nov. 29, 2023

(65) Prior Publication Data

US 2024/0183685 A1    Jun. 6, 2024

Related U.S. Application Data

(60) Provisional application No. 63/534,154, filed on Aug. 23, 2023, provisional application No. 63/429,167, filed on Dec. 1, 2022, provisional application No. 63/429,165, filed on Dec. 1, 2022, provisional application No. 63/429,172, filed on Dec. 1, 2022.

(51) Int. Cl.
*G01C 21/00*    (2006.01)

(52) U.S. Cl.
CPC ..... *G01C 21/3867* (2020.08); *G01C 21/3848* (2020.08)

(58) Field of Classification Search
CPC . G01C 21/3867; G01C 21/3848; G01C 21/00
USPC .......................................................... 701/438
See application file for complete search history.

(56) References Cited

U.S. PATENT DOCUMENTS

| | | | |
|---|---|---|---|
| 2021/0112704 A1* | 4/2021 | Cavender-Bares | A01B 69/008 |
| 2021/0132608 A1* | 5/2021 | Cavender-Bares | A01B 51/02 |
| 2022/0317691 A1* | 10/2022 | Eskandari | A01B 69/001 |

* cited by examiner

*Primary Examiner* — Shardul D Patel
(74) *Attorney, Agent, or Firm* — Rathe Lindenbaum LLP

(57) ABSTRACT

A mapping system may include a display, a global positioning satellite (GPS) system to be carried by a vehicle and a controller. The controller is configured to determine a polygon representing a geographic boundary of a first region based on signals received from the GPS system of the vehicle as the vehicle travels to enclose the first region, to estimate geographic coordinates of a first number of consecutive rows within the polygon based on signals from the GPS system of the vehicle as the vehicle travels between a second number of consecutive rows less than the first number of consecutive rows and to output control signals causing the display to present a map comprising the polygon and lines within the polygon, the lines being based on the estimated geographic coordinates of the first number of consecutive rows.

20 Claims, 11 Drawing Sheets

MAPPING

CROSS-REFERENCE TO RELATED APPLICATIONS

The present non-provisional application claims priority from U.S. provisional patent Application Ser. No. 63/429,165 filed on Dec. 1, 2022, by Gatten et al. and entitled MAP GENERATION, U.S. provisional patent Application Ser. No. 63/429,167 filed on Dec. 1, 2022, by Gatten et al. and entitled AUTOMATIC GENERATION OF MAP FEATURES, U.S. provisional patent Application Ser. No. 63/429,172 filed on Dec. 1, 2022, by Gatten et al. and entitled FARM ELEMENT MAPPING, and U.S. provisional patent Application Ser. No. 63/534,154 filed on Aug. 23, 2023, by Gatten et al. and entitled VEHICLE CONTROL, the full disclosures of which are hereby incorporated by reference.

BACKGROUND

Agricultural autonomy is heavily dependent on having accurate maps. Mapping plant rows, such as those found in crop fields, vineyards, and orchards, may be labor intensive and may require many hours.

Figure 1:
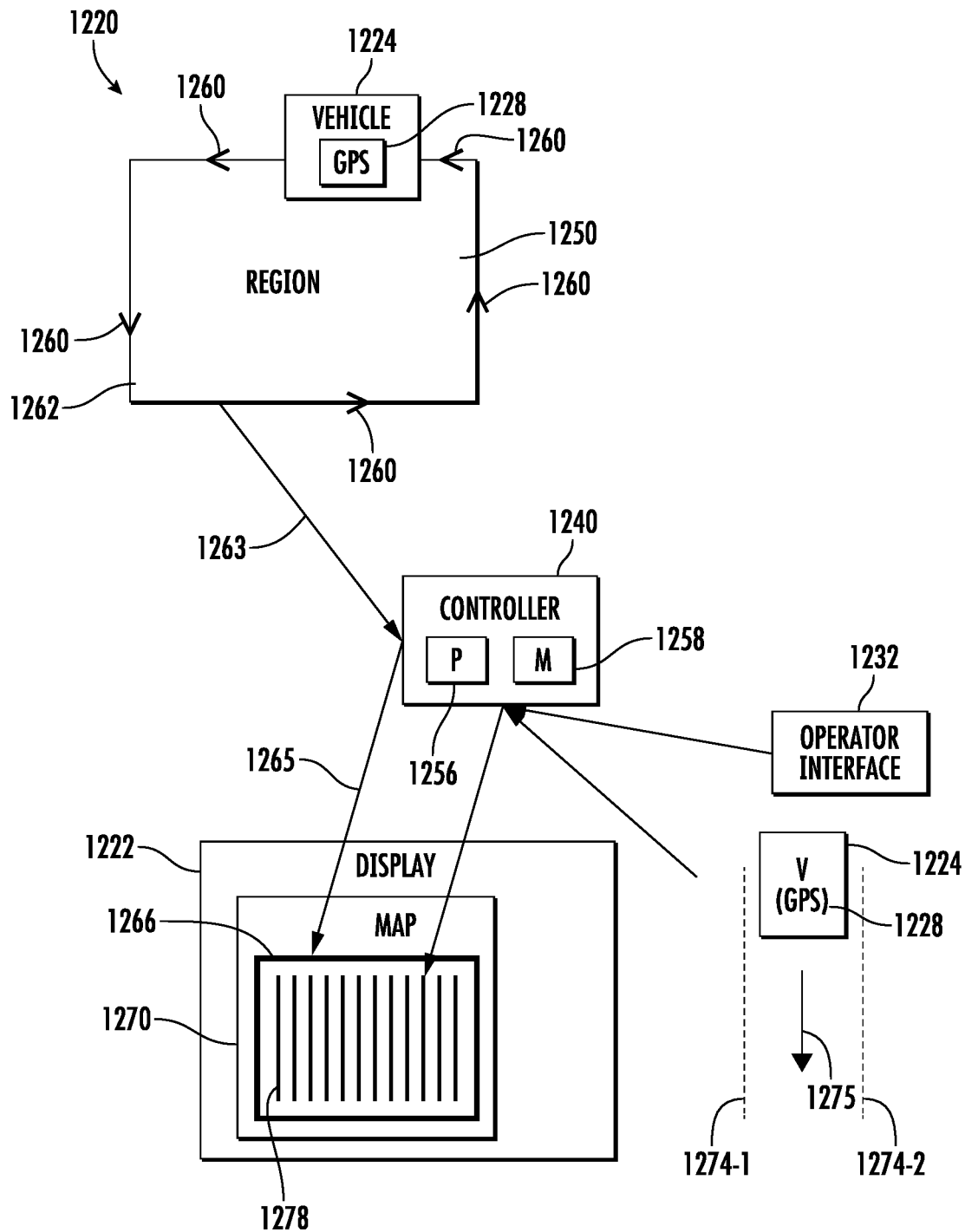
FIG. 1 is a diagram schematically illustrating portions of an example mapping system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example mapping systems, mapping mediums and mapping methods that facilitate customizing automated mapping of agricultural regions and their respective plant rows. Examples of such agricultural regions include fields, vineyards and orchards. The example mapping systems, mediums and methods provide maps that may be displayed for an operator or manager, and which may be used for automated operations of agricultural vehicles and/or associated implements/attachments.

The example mapping systems, mediums and methods output maps which provide accurate and precise geographic coordinates for the individual plant rows of an agricultural region or for vehicle lanes between such plant rows. The example mapping systems, mediums and methods identify and determine such plant rows or vehicle lanes without the possibly burdensome task of manually identifying each individual row and without having to drive a vehicle between and along each and every plant row. As result, such maps may be generated at a lower cost and in less time.

The example mapping systems, mediums and methods may further facilitate the identification and mapping of geological and non-geological elements. Geological elements are those elements pertaining to the natural geological characteristics of the agricultural region such as bodies of water (including, but not limited to, wetlands, ponds, lakes, streams, creeks, rivers), sinkholes, mounds, boulders, undeveloped forested areas, trees, and the like. Non-geological elements are those elements that are temporary or that have their presence due to human activity. Example of non-geological elements include, but are not limited to, containers (such as harvest/crop, insecticide, herbicide, and fertilizer storage bins, silos, fuel tanks, and water tanks), vehicle electrical charging stations or fueling stations, and the like, buildings, pastures, roads, fence lines and the like.

In some implementations, the mapping systems, mediums and methods comprise an operator interface by which an operator may identify and add icons or other markings identifying the type and location of such geological and non-geological elements on the map. In some implementations, the example mapping systems, mediums and methods may receive or obtain an image of the agricultural region, such as from a satellite image or an aerial image, and use optical analysis or recognition (segmentation) to identify and classify geological and/or non-geological elements in the image, wherein the identified and classified geological and/or non-geological elements may then be added (either automatically or upon authorization/confirmation from a person) to the map. For example, in some implementations, artificial intelligence, a neural network or machine learning may be used to automatically identify such elements in a received or obtained aerial or satellite image of the agricultural region, wherein the identification, classification and geographical coordinates of the identified elements are used to add icons or other representations of such elements at the appropriate locations in the map which correspond to the identified geographical locations of the elements.

In some implementations, the example mapping systems, mediums and methods may overlay an image, such as a satellite image or an aerial image, of the agricultural region over or beneath the generated map. The geographical coordinates of points in the image may be aligned with corresponding geographical coordinates of points in the map. As result, the map, when displayed, may depict other geological and non-geologic elements which have not been specifically identified and classified.

In some implementations, the example mapping systems, mediums and methods may comprise area indicators. Area indicators may be applied to polygons so as to identify control or other characteristics of particular regions or areas. Such area indicators may be in the form of the line thickness of the polygon, the border style of the polygon, shading within the polygon, highlighting within or over the polygon, color, textual labels or other markings indicating control or other characteristics of the particular regions or areas bounded by the particular polygon.

For example, the map may comprise a first polygon defining an agricultural region and surrounding a series of parallel lines or bars which identify the geographic coordinates of plant rows or vehicle travel spaces. The map may further comprise a second polygon, at least partially surrounding the first polygon, wherein the second polygon outlines or defines a larger region that has or offers wireless communications capabilities for the vehicle and that may surround additional polygons that also include their respective series of parallel lines or bars (identifying plant rows or vehicle travel spaces). The map may further comprise a third polygon, at least partially containing the second polygon, wherein the third polygon outlines or defines the boundaries of ownership for land.

In some implementations, the area indicators may be applied to polygons so as to identify assignments to particular vehicle fueling or charging stations. For example, the map may include multiple polygons, each polygon (containing plant rows or vehicle travel spaces) being color-coded, shaded, labeled or otherwise marked so as to identify which of a plurality of charging stations are assigned to recharging a refueling the vehicle when operating in the agricultural region defined by the particular polygon. Such area indicators may inform a person operating the vehicle where to recharge or refuel the vehicle or may indicate to an automated controller or control system where the vehicle should be driven for refueling or recharging when carrying out operations in a particular agricultural region defined by a particular polygon. For example, a recommended charging station, given the current location of the vehicle, may be highlighted by a particular color, brightness or flashing on the displayed map. In some implementations, the vehicle the controller configured to: (1) determine a remaining battery or fuel charge; (2) identify a charging station or refueling station for the vehicle based upon the remaining battery charge; and (3) output control signals causing the display to indicate a location of the charging station/refueling station on the map.

In some implementations, the area indicators may be applied to polygons so as to identify the type of plants growing in a particular agricultural region and/or a particular growth stage or condition of the plants in a particular agricultural region. The area indicators may be applied to polygons to indicate at least one prior completed operation, a currently ongoing operation or an operation scheduled to be performed in an agricultural region of the particular polygon. The polygons may be color-coded, shaded, provided with particular border styles, highlighted, labeled or otherwise marked to indicate such information. Such information may be automatically generated and applied to the map or may be applied in response to information received from an operator via an operator interface. In some implementations, such information may be determined or derived in an automated fashion by machine learning, optical analysis or the like using satellite images, aerial images or images acquired from cameras carried by vehicle.

In some implementations, the area indicators may be applied to polygons so as to identify or designate the level of automation that may be utilized when performing operations on agricultural region defined by the polygon. For example, the first polygon may have a first applied area indicator which indicates that the vehicle must be operated manually (a manual mode) when performing operations in the region. A second polygon may have a second applied area indicator indicating that the vehicle may be operating in one or more of a manual, copycat, follow me or auto drive mode.

In some implementations, the area indicator may be applied to polygons so as to designate a selected type of vehicle control to be performed or utilized on the agricultural region defined by the polygon. For example, a controller/operator may determine that a vehicle performing an operation in the first region defined by a first polygon should be controlled manually. The controller/operator may decide to determine that the vehicle performing an operation in a second region defined by a second polygon should be controlled in an automated fashion (auto drive) the controller are permitted determine or decide that vehicle performing operations in a third region defined by a third polygon should be controlled using a copycat or follow me mode. Each of the different modes may be designated by a different distinct area indicator applied to each polygon. Such designations may assist a manager or automated controller in assigning vehicles and personnel to different agricultural regions for different operations.

In some implementations, the area indicators may indicate limitations or designations for particular types of equipment that may be or are to be used in an agricultural region defined by a particular polygon. For example, a first agricultural region defined by first polygon may have an area indicator which indicates that only vehicles up to a particular weight, wheelbase, horsepower, size, and/or functional capability are to be used in the particular agricultural region. Other area indicators may indicate that only vehicles above a particular weight, wheelbase, horsepower, size and/or functional capability are to be used in a particular agricultural region. Some area indicators may identify minimum or maximum sizes or capabilities for the agricultural implements or attachments being utilized in the particular agricultural region. Such information may be automatically determined by an automated controller or may be received from a manager or operator via an operator interface. Such area indicators may provide assistance to a manager or automated control when assigning or delegating tasks to different equipment and personnel for different agricultural regions defined by different polygons. In some implementations, the vehicle may comprise a tractor attached to an implement. In such implementations, the controller may be further configured to: (1) determine a type or characteristic of the implement; (2) determine selected regions based upon the type or the characteristic of the implement; and (3) output control signals causing the display to indicate the selected regions.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, unless otherwise explicitly set forth, the recitation of a "processor", "processing unit" and "processing resource" in the specification, independent claims or dependent claims shall mean at least one processor or at least one processing unit. The at least one processor or processing unit may comprise multiple individual processors or processing units at a single location or distributed across multiple locations.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this, unless explicitly recited to the contrary, recitations reciting that signals "indicate" a value or state means that such signals either directly indicate a value, measurement or state, or indirectly indicate a value, measurement or state. Signals that indirectly indicate a value, measure or state may serve as an input to an algorithm or calculation applied by a processing unit to output the value, measurement or state. In some circumstances, signals may indirectly indicate a value, measurement or state, wherein such signals, when serving as input along with other signals to an algorithm or calculation applied by the processing unit may result in the output or determination by the processing unit of the value, measurement or state.

FIG. 1 is a diagram schematically illustrating portions of an example mapping system 1220. System 1220 comprises display 1222, global positioning satellite (GPS) system 1228, operator interface 1232, and controller 1240. In some implementations, system 1220 may additionally comprise vehicle 1224. Vehicle 1224 may be in the form of an agricultural vehicle such as a tractor, harvester, truck, sprayer, applicator, or other self-propelled agricultural vehicle. In some implementations, vehicle 1224 may comprise a passenger vehicle, a construction vehicle or other non-agricultural vehicle. Vehicle 1224 configured to travel across and around regions of land or agricultural regions.

Display 1222 comprises a device configured to present a visible presentation to a person. Display 22 may be carried by vehicle 1224 or may be remote from vehicle 1224. Display 1222 may be in the form of a monitor or a screen of a portable electronic device, such as a screen of a smart phone, laptop computer or tablet computer. Display 1222 is configured to present a visible map for optical viewing by an operator or manager.

GPS 1228 comprises a receiver or other hardware configured to output signals indicating geographical coordinates of vehicle 1224. GPS system 1228 is carried by vehicle 1224 as vehicle 1224 travels around or within the geographic region 1250.

Operator interface 1232 comprise a device by which a human or person may input commands or information for receipt by. Operator interface 1232 may be carried by vehicle 1224 or may be remote from vehicle 1224 (where operant interface 1232 communicates with controller 1240 and/or vehicle 1224 in a wireless fashion). In some implementations, operator interface 1232 may be provided as part of display 1222, wherein display 1222 comprises a touchscreen or where display 1222 includes one or more graphical user interfaces (icons, pointers or the like) for manipulation by a mouse, stylus, pointer, touchpad, keyboard or the like of operator interface 1232. In some implementations operator interface 1232 may be separate from display 1222.

Controller 1240 comprises processor 1256 and memory 1258. Processor 1250 comprises a processing unit configured to carry out operations based upon instructions provided by memory 1258. Processor 1256 may output control signals controlling components of vehicle 1224 and may analyze or perform calculations upon information or data received from various associated with vehicle 1224, such as GPS 1228. Processor 1256 may further carry out operations in response to input commands or information received from an operator through operator interface 1232.

Memory 1258 comprises a non-transitory computer-readable medium containing instructions for directing processor 1256 to carry out mapping of one or more agricultural regions. In the example illustrated, memory 1258 contains instructions for directing processor 1256 and controller 1240 to carry out an example method 1300 of FIG. 2. As indicated by block 1204 in FIG. 2, instructions in memory 1258 direct processor 1256 to determine a polygon representing a geographic boundary of an agricultural region based upon GPS signals received from vehicle 1224 as of vehicle 1224 travels to enclose the region 1250.

As shown by arrows 1260 in the example shown in FIG. 1, vehicle 1224 may be manually steered and driven along a boundary 1262 of region 1250. As vehicle 1224 travels along a boundary 1260, GPS system 1228 outputs GPS signals indicating the geographical coordinates of boundary 1262. As indicated by arrow 1263, such GPS signals (or other signals derived from the GPS signals) may be a measly transmitted to controller 1240, may be periodically transmitted to controller 1240 or may be temporarily stored for subsequent transmission to controller 1240.

As indicated by arrow 1265 in FIG. 1, controller 1240 utilizes signals that are from GPS 1228 or that are based upon signals from GPS 1228 to determine the size, shape and geographic coordinates or location of polygon 1266. The size, shape and geographic coordinates of polygon 1266 are further used by controller 1240 to present polygon 1266 as part of a displayed map 1270. Although method 1270 is illustrated as including a single polygon, in other implementations or circumstances, map 1270 may include multiple polygons 1266 defining the boundaries of multiple different distinct regions 1250. Such multiple polygons may have different sizes and shapes.

Figure 2:
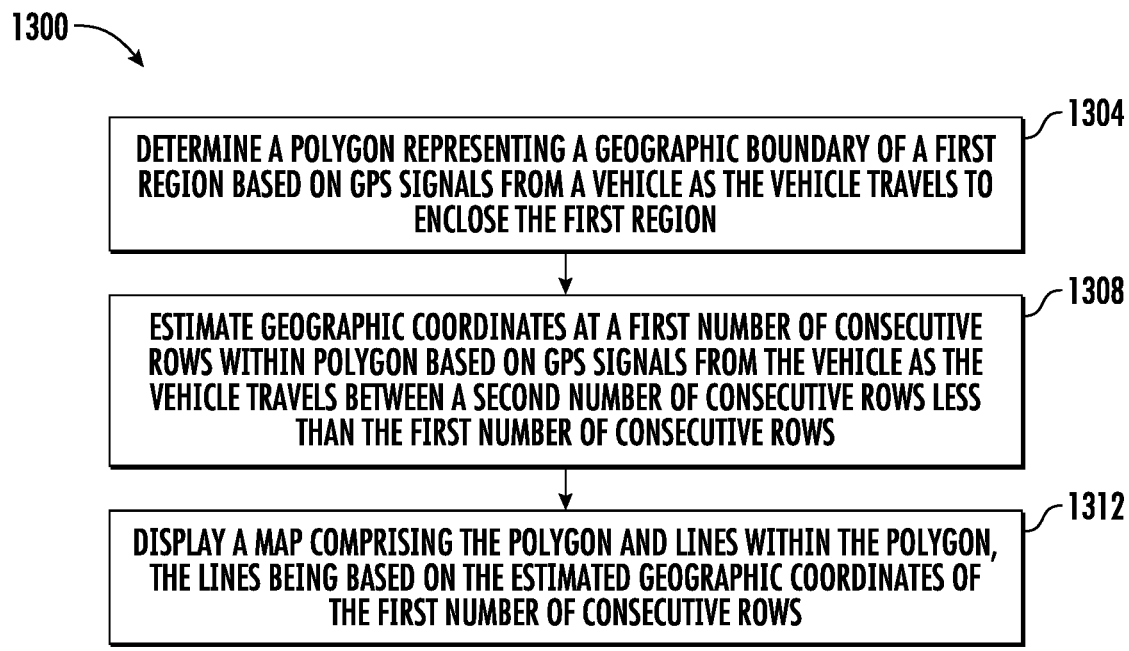
FIG. 2 is a flow diagram of an example mapping method.

As indicated by block 1308 in FIG. 2, controller 1240 (processor 1256 following instructions in memory 1258) estimates the geographic coordinates of a first number of consecutive rows within the polygon based upon GPS signals from the vehicle 1224 as a vehicle 1224 travels between a second number of consecutive rows less than the first number of consecutive rows. Said another way, controller 1240 estimates the geographic coordinates of a first number of rows within region 1250 (within polygon 1266) based upon signals from GPS 1228 without vehicle 1224 having to travel between each and every pair of consecutive rows.

In the example illustrated in FIG. 1, vehicle (V) 1224 is driven between and along consecutive plant rows 1274-1 and 1274-2 as indicated by arrow 1275. Plant rows 1274-1 and 1274-2 may comprise rows of vines, rows of trees, rows of a crop such as corn, beans or the like. Plant rows 1274-1 and 1274-2 may alternatively comprise unplanted areas where plants, trees or crops are to be planted or sowed. As vehicle 1224 travels between rows 1274-174-2, signals from GPS 1228 are transmitted to controller 1240 or are stored for subsequent transmission to controller 1240. Such GPS signals indicate or may be used to determine the geographic coordinates of the travel route 1275 of vehicle 1224. These geographic coordinates may correspond to a vehicle lane. Presuming that the vehicle lane and its coordinates are centered between plant rows 1274-1, 1274-2, the geographic coordinates of rows 1274-1 and 1274-2 may likewise be determined from the geographic coordinates of the lane or path 1275. In some implementations, rather than presuming that vehicle 1224 and is path 1275 are centered between rows 1274 of 1 and 1274-2, the relative spacing of the vehicle path or lane with respect rows 1274-1 and 1274-2 may be determined based upon signals from one or more cameras carried by vehicle 1224 that capture images of the rows 1274-1, 1274-2. Using the predetermined or known position of the cameras on the vehicle and optical analysis of the images, controller 1240 may determine the spacing of vehicle 1224 from row 1234-1 and the spacing of vehicle 1224 from row 1274-2 as vehicle 1224 travels along the path of arrow 1275. An example of such a method is found in US patent publication 20230094371 by Bhupatiraju and entitled VEHICLE ROW FOLLOW SYSTEM, the full disclosure of which is hereby incorporated by reference.

In the example illustrated, system 1220 additionally comprises operator interface 1232. Controller 1240 may request an operator to input the row spacing or the number of rows within the culture region, within polygon 1266. Using a combination of the row spacing and the geographic coordinates for either path/lane 1275 or rows 1274-1 and 1274-2, controller 1240 may estimate the geographic coordinates for the remaining other lanes 1275 or remaining other plant rows 1274 in the agricultural region defined by polygon 1266. For example, if the lane traversed by vehicle 1224 has particular geographic coordinates, the next consecutive lane will have the same particular geographic coordinates plus or minus an integer of an offset corresponding to the row spacing, and so on for the remaining lanes. Likewise, if plant row 1274-1 is determined to have a particular set of geographic coordinates, the next consecutive plant row will have the same particular set of geographic coordinates plus or minus an integer of an offset distance corresponding to the row spacing, and so on for the remaining plant rows.

As indicated by block 1312 in FIG. 2, controller 1240 displays a map 1270 (shown in FIG. 1) which comprises the polygon 1266 and lines 1278 within the polygon 1266. The positioning, length and spacing of the lines are based upon the estimated geographic coordinates of the first number of consecutive rows. Map 1270 may be stored for subsequent use. For example, map 1270 may be utilized by an automated vehicle for steering the vehicle along and between plant rows. Map 1270 may be utilized by an automated vehicle for controlling operation of an implement or attachment pushed, pulled or carried by the vehicle. Map 1270 may be utilized by a management system or a person to administer or plan current and future operations in region 1250. As will be described hereafter, map 1270 may be further supplemented with geological and non-geological elements and with additional area indicators (as noted above).

Figure 3:
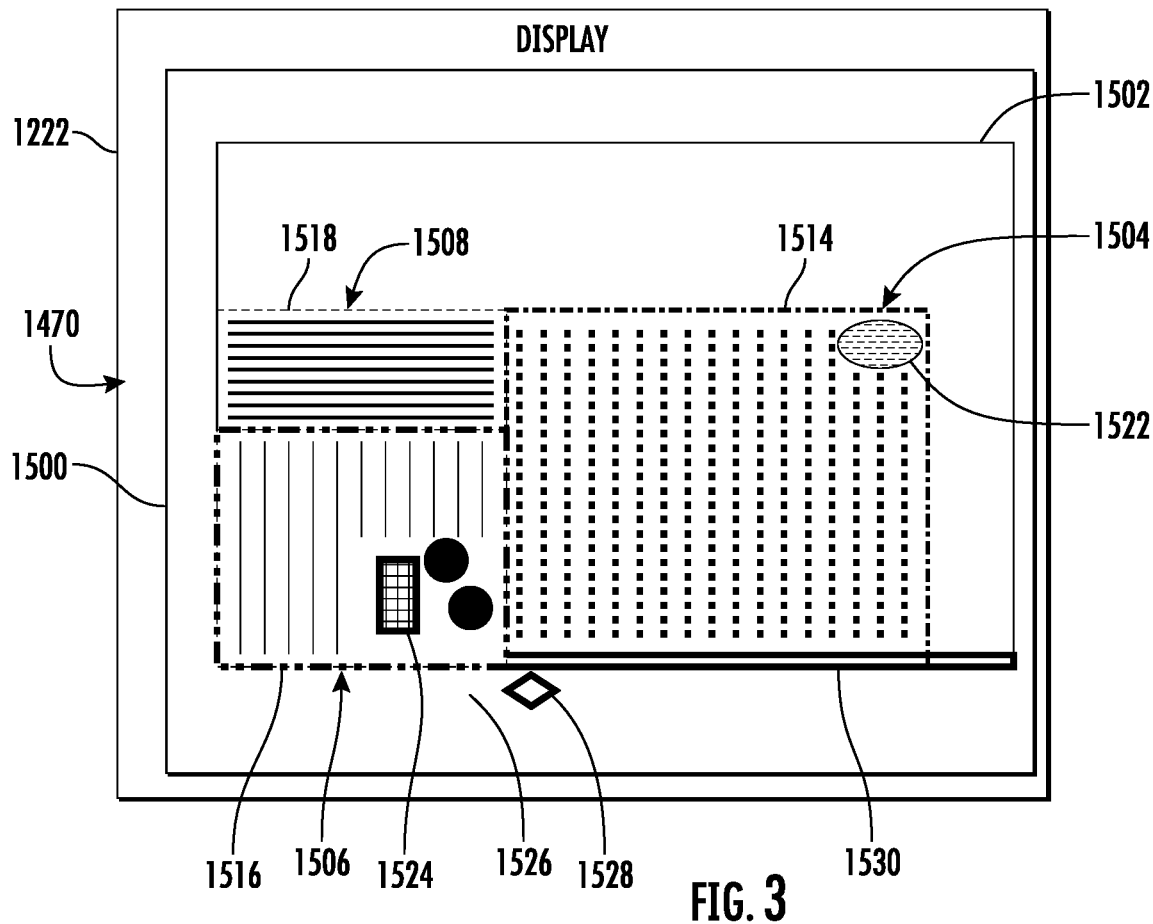
FIG. 3 is a diagram schematically illustrating portions of an example display presenting an example map 1 generated by an example mapping system.

FIG. 3 is a diagram illustrating an example of display 1222 presenting an example map 1470 generated by controller 1240. FIG. 3 illustrates an example of how controller 1240 may generate and present a map comprising multiple polygons representing the boundaries of multiple agricultural regions with each polygon containing the estimated coordinates for plant rows. FIG. 3 further illustrates an example of how the generated map may include additional polygons, wherein the different polygons have different area indicators that identify characteristics of the area bound by the polygon. FIG. 3 further illustrates an example of how the generated map may include geological the nongeological features or elements.

Map 1470 comprises polygons 1500, 1502, 1504, 1506 and 1508. Each of polygons 1500, 1502, 5006 and 1508 may be defined by lines representing the boundaries of an agricultural region. Such boundaries (geographic coordinates) may be determined based upon GPS signals from a vehicle, such as the vehicle 1224, as the vehicle travels to enclose the particular agricultural regions. In the example illustrated, each of such polygons 1500, 1502, 1504, 5006 and 1508 has at least one associated area indicator which identifies a characteristic or property associated with the agricultural region.

Area indicators may be applied to polygons 1500, 1502, 1504, 1506 and 1508 so as to identify control or other characteristics of particular regions or areas. Such area indicators may be in the form of the line thickness of the polygon, the border style of the polygon, shading within the polygon, highlighting within or over the polygon, color of the border or color highlighting within the polygon border, textual labels or other markings indicating control or other characteristics of the particular regions or areas bounded by the particular polygon.

In the example illustrated, polygon 1500 has an area indicator which indicates particular ownership of the geographic region enclosed by the polygon. Polygon 1500 encloses a geographic region corresponding to the boundaries of property or land based upon ownership of such land. Prior to, during or after the creation of polygon 1500, a manager or other person may input information to controller 1240 using operator interface 1232 to label polygon 1500 as the boundaries of a particular farm, vineyard or orchard.

In the example illustrated, polygon 1502 is associated with an area indicator that indicates that the geographic region or regions within polygon 1502 offer wireless communications capabilities for the vehicle. The boundaries of such regions may be dependent upon proximity to a wireless router, a cellular data tower or the like. In some implementations, a manager or other person may input information to controller 1240 using operator interface 1232 indicating the characteristic represented by the area indicator of polygon 1502. For example, prior to, during or after the creation of polygon 1502, a manager or other person may input information to controller 1240 using operator interface 1232 to label polygon 1500 as those regions for which wireless communication is available. In some implementations, the extent of polygon 15 may be automatically determined during operation of vehicle 1224, wherein vehicle 1224 determines the geographic coordinates of polygon 1502 based upon the reception or transmission of wireless signals to and from vehicle 1224. As shown by FIG. 3, polygon 1502 may be in within the larger polygon 1500 based upon property ownership. As further shown by FIG. 3, polygon 1502 may enclose multiple smaller polygons 1504, 1506 and 1508 which may have other area indicators.

In the example illustrated, each of polygons 1504, 1506 and 1508 have distinct area indicators 1514, 1516 and 1518, respectively, in the form of distinct line thicknesses and/or line styles (--; -.-; and -..-). As noted above, in addition to or alternative to distinct line thicknesses and line styles, such distinct area indicators may have other forms such as line color, line brightness, shading within the boundaries of the polygon, color within the boundaries of the polygon and the like. Each of such distinct area indicators may indicate a distinct characteristic associated with the enclosed agricultural region.

In some implementations, the area indicators 1514, 1516 and 1518 may be applied to different polygons so as to identify assignments to particular vehicle fueling or charging stations. For example, area indicators 1514, 1516 and 1518 may identify which of a plurality of charging stations are assigned to recharging or refueling the vehicle 1224 when operating in the agricultural region defined by the particular polygon. Such area indicators may inform a person operating the vehicle where to recharge or refuel the vehicle or may indicate to an automated controller or control system where the vehicle should be driven for refueling are recharging when turning out operations in a particular agricultural region defined by a particular polygon.

In some implementations, the area indicators 1514, 1516 and 1518 may be applied to their respective polygons so as to identify the type of plants growing in a particular agricultural region and/or a particular growth stage or condition of the plants in a particular agricultural region. The area indicators 1514, 1516 and 1518 may be applied to the polygons based upon or to indicate at least one prior completed operation, a currently ongoing operation or an operation scheduled to be performed in an agricultural region of the particular polygon. Such information may be automatically generated and applied to the map or may be applied in response to information received from an operator via operator interface 1232. In some implementations, such information may be determined or derived in an automated fashion by machine learning, optical analysis or the like using satellite images, aerial images or images acquired from cameras carried by vehicle 1224 or another vehicle.

In some implementations, the area indicators 1514, 1516 and 1518 may be applied to polygons so as to identify or designate the level of automation or type of control that may be utilized when performing operations on the agricultural region defined by the polygon. For example, the first polygon 1504 may have a first applied area indicator 1514 which indicates that the vehicle must be operated manually (a manual mode) when performing operations in the region. A second polygon 1506 may have a second applied area indicator 1516 indicating that the vehicle may be operating in one or more of a manual, copycat, follow me or auto drive mode. The third polygon 1508 may have a third applied area indicator 1518 indicating that the vehicle may be operated in a copycat or follow me mode. Such designations may assist a manager or automated controller in assigning vehicles and personnel to different agricultural regions for different operations.

In some implementations, the example area indicators 1514, 1516 and 1518 may indicate limitations or designations for particular types of equipment that may be or are to be used in an agricultural region defined by a particular polygon. For example, a first agricultural region defined by first polygon 1504 may have an area indicator 1514 which indicates that only vehicles up to a particular weight, wheelbase, horsepower, size, and/or functional capability are to be used in the particular agricultural region. Other area indicators may indicate that only vehicles above a particular weight, wheelbase, horsepower, size and/or functional capability are to be used in a particular agricultural region. Some area indicators may identify minimum or maximum sizes or capabilities for the agricultural implements or attachments being utilized in the particular agricultural region. Such information may be automatically determined by an automated controller or may be received from a manager or operator via an operator interface. Such area indicators may assist a manager or automated control when assigning or delegating tasks to different equipment and personnel for different and cultural regions defined by different polygons.

In particular implementations, each of the polygons may have multiple area indicators, wherein each type of area indicator indicates a particular characteristic of the particular polygon. For example, distinct line styles may be used to designate the type of plants growing in a particular agricultural region and/or a particular stage of the plants in a particular agricultural region. Distinct line colors may be used to designate assigned refueling are recharging stations. Distinct line thicknesses may be used to designate automation levels or types of control permitted in a particular agricultural regions. Distinct color or shading of the regions within a polygon may be used to designate equipment limitations for the particular agricultural region. In some implementations, controller 1240 may automatically generate a legend for presentation by display 1222 alongside or within portions of map 1470.

As shown by FIG. 3, each of the polygons 1504, 1506 and 1508 includes lines representing the plant rows (such as those determined in block 1304 of method 1300). Such lines may have different spacings representing different plant row spacings in the particular regions. Such lines may have different line styles, colors, thicknesses or other distinctions which identify characteristics of the plants such as the type of plant or the stage of growth or condition of such plants. In some implementations, such lines may have different characteristics indicating disease or infestation levels. In some implementations, such lines may have distinct characteristics indicating different expected yield levels.

In some implementations, such lines may vary within a line itself. For example, a first portion of a line representing a plant row may have a first line thickness, color, line style or the like indicating a first disease or infestation level, a first amount of applied fertilizer, insecticide or herbicide, a first yield, and/or a first soil condition or type, whereas a second portion of the same line representing the plant row may have a second distinct line thickness, color, line style or the like indicating a second different or distinct disease or infestation level, a second distinct amount of applied fertilizer, insecticide or herbicide, second distinct yield and/or a second distinct soil condition or type.

As shown by FIG. 3, controller 1240 may additionally determine and present geological and non-geological elements as part of map 1470. Geological elements are those elements pertaining to the natural geological characteristics of the agricultural region such as bodies of water (including, but not limited to, wetlands, ponds, lakes, streams, creeks, rivers), sinkholes, mounds, boulders, undeveloped forested areas, trees, and the like. Non-geological elements are those elements that are temporary or that have their presence due to human activity. Example of non-geological elements include, but are not limited to, containers (such as harvest/crop, insecticide, herbicide, and fertilizer storage bins, silos, fuel tanks, water tanks, vehicle electrical charging stations or fueling stations, and the like), buildings, pastures, roads, fence lines and the like.

In some implementations, an operator may identify and add icons or other markings identifying the type and location of such geological and non-geological elements on the map using operator interface 1232. In some implementations, controller 1240 may receive or obtain an image of the agricultural region, such as from a satellite image or an aerial image, and use optical analysis or recognition to identify and classify geological and/or non-geological elements in the image, wherein the identified and classified geological and/or non-geological elements may then be added (either automatically or upon authorization/confirmation from a person) to the map. For example, in some implementations, artificial intelligence, a neural network or machine learning may be used to automatically identify such elements in a received or obtained image of the end cultural region, wherein the identification, classification and geographical coordinates of the identified elements are used to add icons or other representations of such elements at the appropriate locations in the map which correspond to the identified geographical locations of the elements.

In the example illustrated, map 1470 includes a non-agricultural element 1522 in the form of a body of water within polygon 1504. Map 1470 further includes non-geological elements 1524, 1526, 1528 and 1530. Element 1524 is in the form of a building or other structure. Elements 1526 are in the form of containers, such as storage bins, silos or tanks and the like. Element 1528 comprises a refueling or recharging station. Element 1530 is in the form of a road. As noted above, such nongeological elements may be drawn or placed by an operator using operator interface 1232 or may be automatically generated and located based upon satellite or aerial images and optical analysis carried out by controller 1240 or other computing devices.

In some implementations, controller 1240 may overlay an image, such as a satellite image or an aerial image over or beneath the generated map 147. The geographical coordinates of points in the image may be aligned with corresponding geographical coordinates of points in the map. As result, the map 1470, when displayed, may depict other geological and non-geologic elements which have not been specifically identified and classified. In some implementations, the map 1470 may be presented in multiple different layers by controller 1240. Each of the different layers may be selectable by an operator to present different information. For example, map 1470 may have a first layer which presents historical yields on top of the polygons and plant rows. Map 1470 may have a second different layer which presents previously applied insecticide, herbicide or fertilizer, or the planned application of insecticide, herbicide or fertilizer on top of the polygons and plant rows. Map 1470 may have a third different layer which presents soil type and size or condition (current moisture level) on top of the polygons and plant rows. In some implementations, a person using system 1220 may a single layer or may select multiple layers for concurrent presentation on display 1222.

In some implementations, controller 1240 may present a person using system 1222 with an opportunity to filter out particular types of information or filter out particular agricultural regions that do not satisfy input criteria. For example, controller 1240 may receive input from a person using system 1222 that causes controller 1240 to only depict particular types of geological elements or particular types of non-geological elements. A person using system 1222 may provide input to controller 1240 causing controller 1240 to only depict particular plant types or only those polygons that permit particular types of equipment and/or automation levels.

Figure 4:
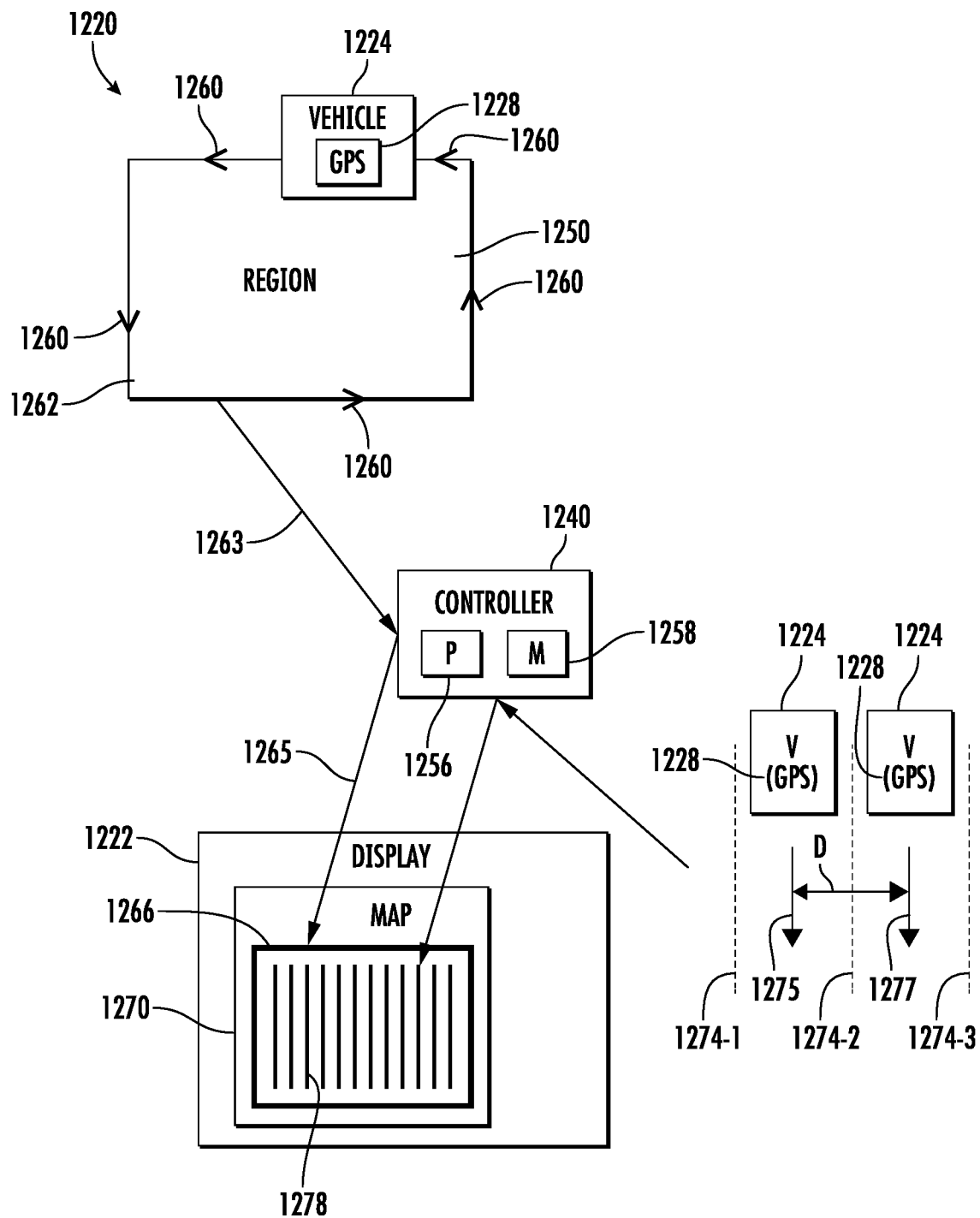
FIG. 4 is a diagram schematically illustrating portions of an example mapping system.

FIG. 4 is a diagram schematically illustrating a second alternative or user selectable mode for system 1220. In lieu of inputting row spacing using operator interface 1232 for the purpose of estimating the geographic coordinates of the first number of consecutive rows (per block 1308 of method 1300), the user selected mode in FIG. 4 automatically determines the row spacing based upon GPS signals received from vehicle 1224 as vehicle 1224 travels between first and second consecutive plant rows 1274-1, 1274-2 as indicated by arrow 1275 and subsequently travels between the second plant consecutive row 1274-2 and a third consecutive plant row 1274-3 as indicated by arrow 1277. The geographic coordinates of vehicle 1224 when traveling along the path indicated by arrows 1275 and 1277 may be used by controller 1240 to estimate the distance D between the centerlines of such rows. Controller 1240 may then utilize this distance D as the uniform or default row spacing when estimating the geographic coordinates and locations of the vehicle lanes and/or other plant rows without vehicle 1224 having to be driven between all of the consecutive plant rows.

Figure 5:
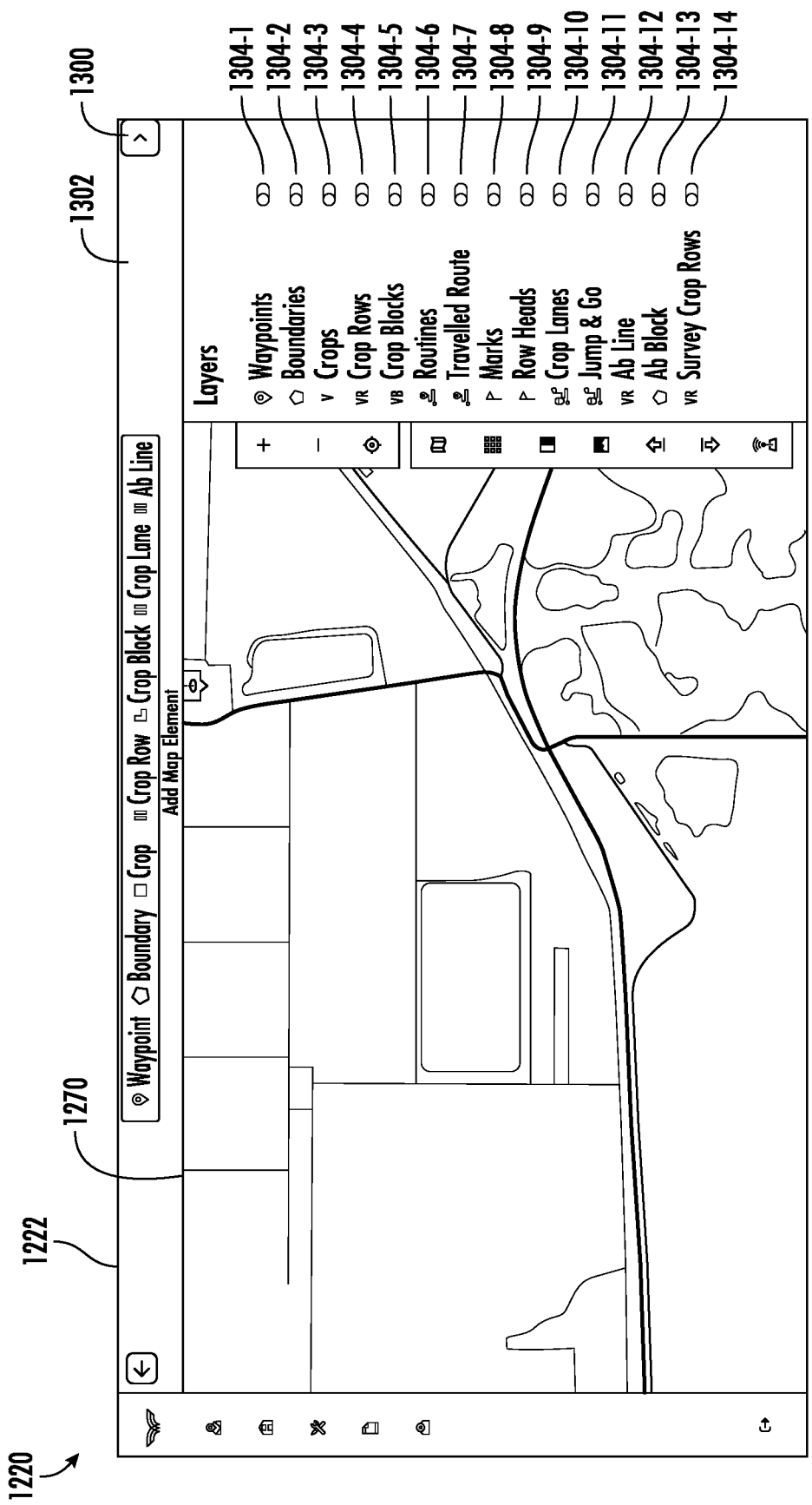
FIG. 5 is an example screenshot of one example mode of operation presented on an example display by an example mapping system, the screenshot depicting an example satellite image of a geographic region with an associated example menu of options.

FIGS. 19-24 illustrate example screenshots of one example mode of operation presented on display 1222 by controller 1240 (shown in FIG. 1) of system 1220. As shown by FIG. 5, system 1220 may operate in a satellite image mode, wherein map 1270 is presented in the form of a satellite image. Controller 1240 outputs control signals causing various menus or user selectable options to be displayed on display 1222 along the perimeter of map 1270. Selection of a layer icon 1300 (such as by positioning a cursor on the icon and depressed mood of a mouse button, or a selection using other means) results in the menu 1302 being presented along a side of the map 1270. Menu 1302 lists various informational layers selection. Such options or layers include waypoints 1304-1, boundaries 1304-2, crops 4-3, crop rows 1304-4, crop blocks 1304-5, routines 1304-6, travel routes 1304-7, marks 1304-8, row heads 1304-9, crop lanes 1304-10, jump and go 1304-11, Ab line 1304-12, AB blocks 1304-13 and a survey of crop rows 1304-14. Selection of waypoints 1304-1 results in controller 1240 presenting a person/user with the prompt an option to add new points or locations on map 1270. Such a selection allows the user to label structures or locations on the map such as a telephone pole, wash station, charging station, fuel station, building or the like. In some implementations, the addition of such waypoints may be automated, wherein such waypoints are identified through optical recognition or machine learning in automatically labeled on map 270.

Selection of boundaries 1304-2 results in controller 1240 presenting the boundaries of various geographic regions, such as a boundaries based upon ownership, accessibility or the like. Selection of crops 1304-3 results in controller 1240 identifying individual crops such as trees, vines stems or the like. Selection of crop rows 1304-4 results controller 1240 presenting or displaying individual crop rows on map 1270. Selection of crop blocks 1304-5 results in controller 1240 identifying collections of rows having similar crop characteristics, portions on map 1270 having different types of crops, plants, vines, trees or the like. For example, different regions having different types of grapevines or different types of orchard trees may be differently color-coded, bounded by different border fonts or styles, enclosed by different shadings or hatching or the like on map 1270 presented on display 1222.

Selection of routines 1304-5 results in controller 1240 identifying those geographic regions on map 1270 upon which different routines or operations were performed. Again, such identification and made using different colors, different fonts, different line styles or thicknesses, different shadings or the like with an associated legend. Examples of routines may be whether a vehicle was operating in an automated fashion, and automated but operate assisted fashion or a manual fashion. Examples of routines may refer to the particular type of field operation being performed (insecticide, herbicide or fertilizer application, pruning, cultivation). In some implementations, in the "routines" layer, all recorded routines or particular type or outlines may be presented. In some implementations, routines are replayed, wherein the user is allowed to toggle between different routines that were performed on the region covered by map 1270.

Selection of travel route 1304-6 results in controller 1240 highlighting or marking a route or travel path taken by vehicle on map 1270. Selection of marks 1304-8 results in controller 1240 marking a particular geographic location, a particular GPS point. These points become marks. Upon being labeled, such points may serve as a waypoint.

Figure 6:
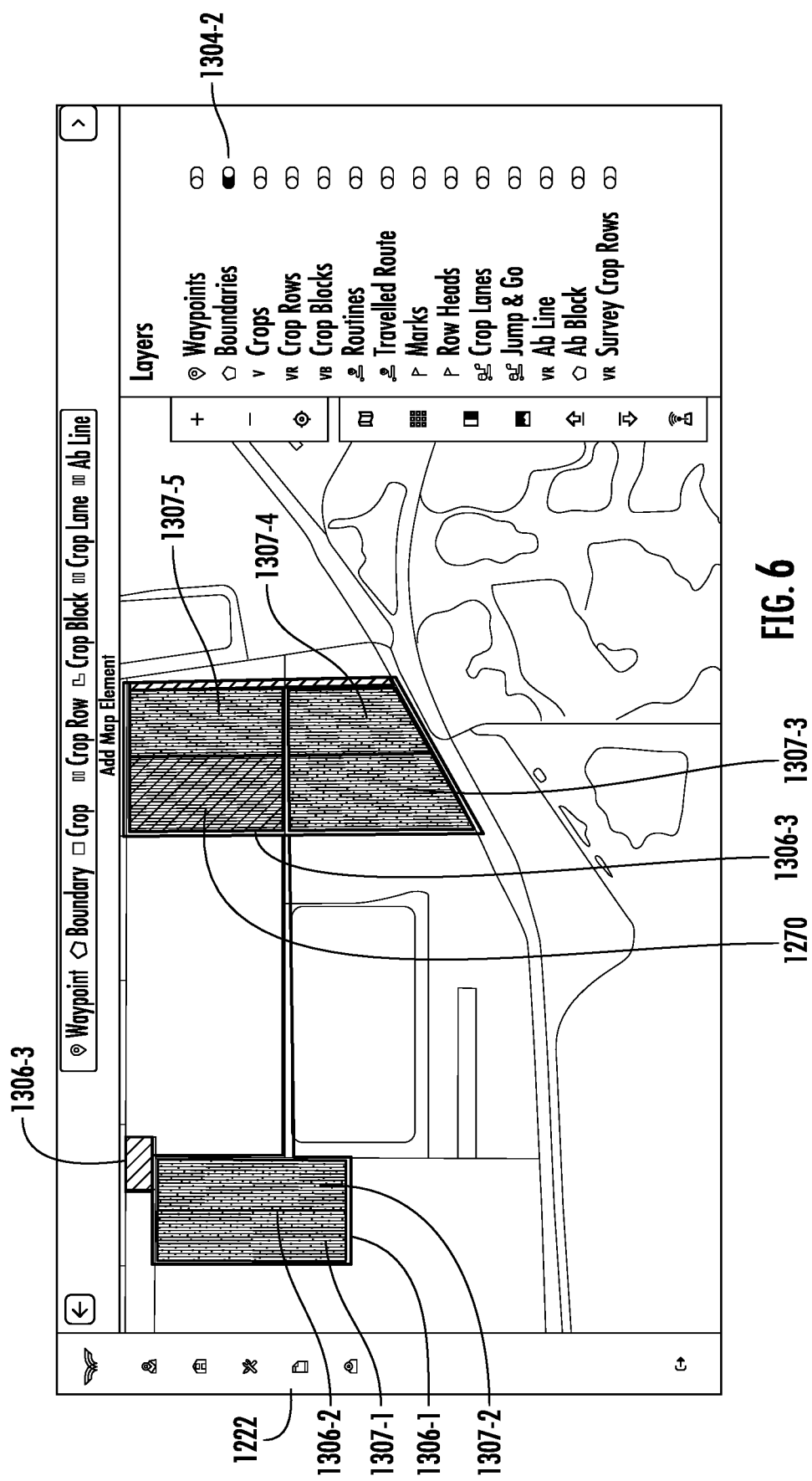
FIG. 6 is an example screenshot of the example mode of operation presented on the example display by the example mapping system of FIG. 5, the screenshot depicting the example satellite image with boundaries in the form of polygons and the associated example menu of options.

As shown may FIG. 6, in response to user/operator/manager selecting the boundaries icon or selection 1304-2, controller 1240 retrieves the geographical coordinates of one or more types of boundaries/polygons and outputs control signals causing display 1222 to depict such boundaries/polygons on map 1270. In the example illustrated, controller 1240 outputs control signals causing display 1222 to provide several sets of boundaries including an outer polygons or boundary 1306-1 identifying property owned by a particular party, boundaries 1306-2 which defined interior polygons within boundary 1306-1, wherein the interior polygons correspond to individual fields, orchards or vineyards. As discussed above, such boundaries may also form other area indicators representing other information such as wireless accessibility, particular regions assigned to designated recharging/refueling stations or the like. Particular boundaries, such as boundaries 1306-3 may define polygons on map 1270 that indicate farm sites such as where rows of crops, vines or trees may not be present. In the example illustrated, the boundaries defined different polygons 1307-1, 1307-2, 1307-1307-4, 1307-5 and 1307-6.

Figure 7:
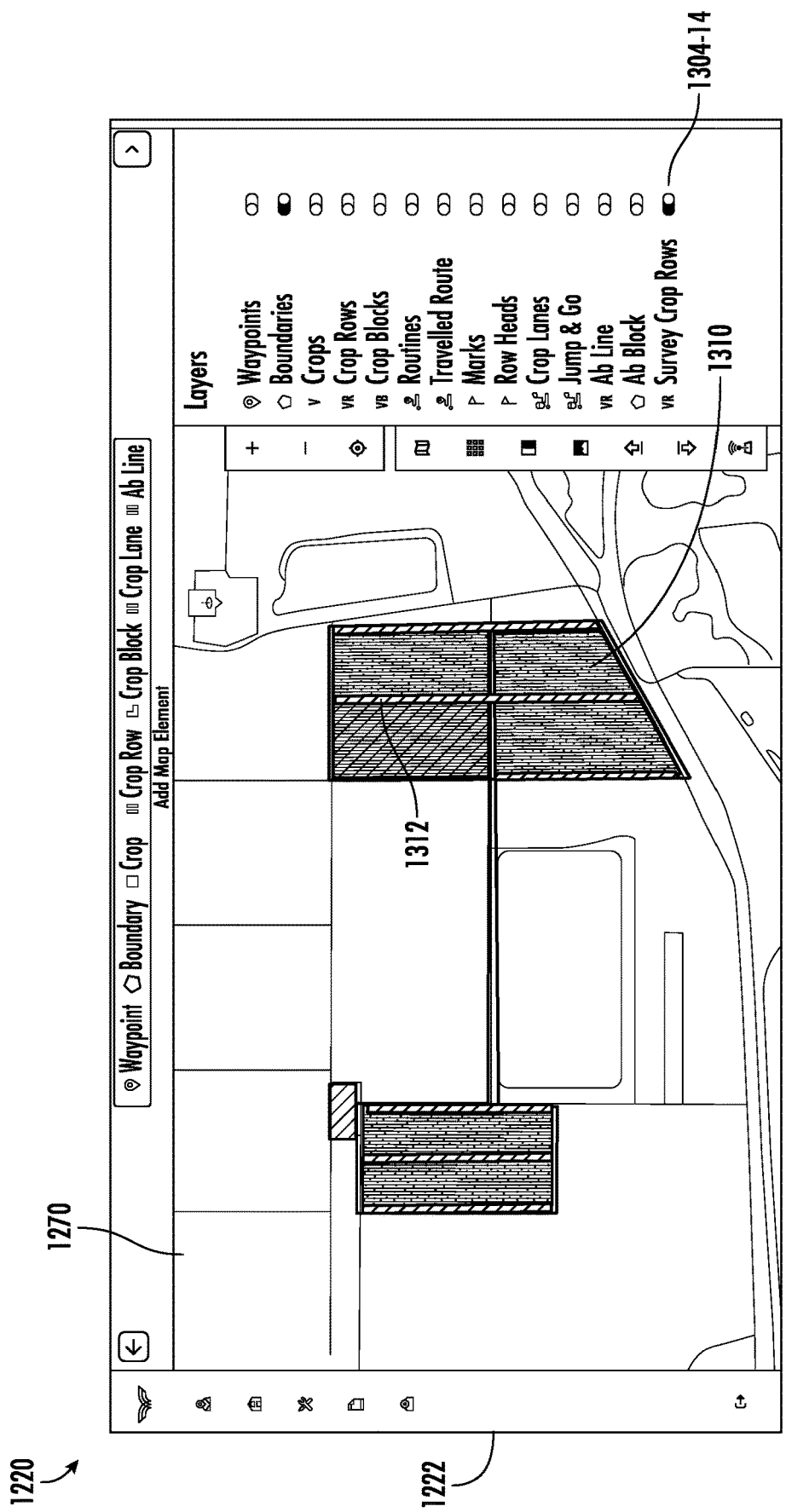
FIG. 7 is an example screenshot of the example mode of operation presented on the example display by the example mapping system of FIG. 5, the screenshot depicting the example satellite image with boundaries in the form of polygons and plant rows within the boundaries, wherein the associated example menu of options are presented alongside the example satellite image.
Figure 8:
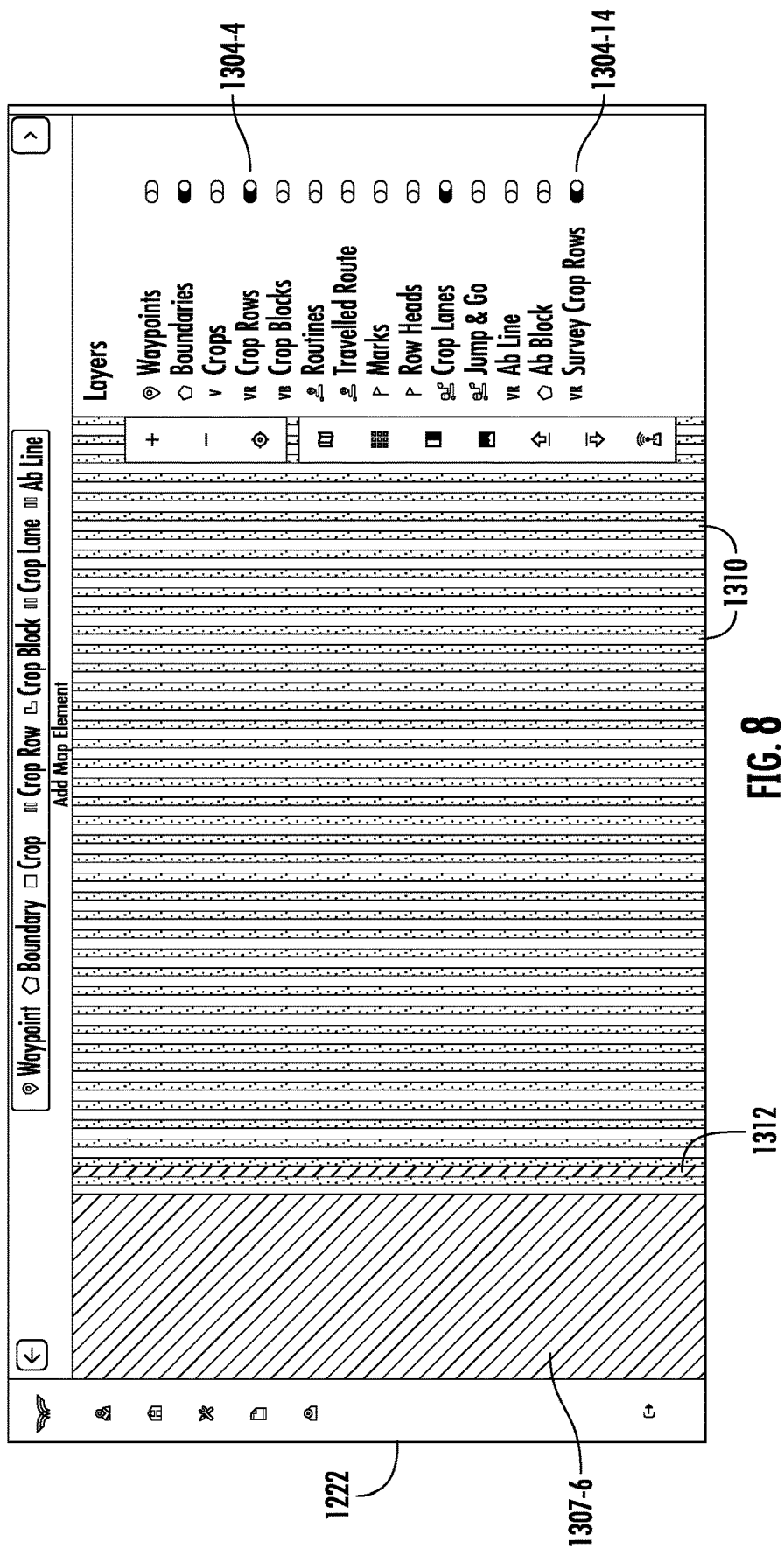
FIG. 8 is an example screenshot of the example mode of operation presented on the example display by the example mapping system of FIG. 5, the screenshot depicting an enlargement of a portion of the example satellite image with enlarged crop/plant rows, wherein the associated example menu of options are presented alongside the example satellite image.

As shown by FIG. 7, in response to a user further selecting the survey crop rows 1304-14, controller 1240 retrieves stored information pertaining to the geographic coordinates of crop rows 1310 and roads 1312, and outputs control signals causing display 1222 to differently depict such crop rows 1310 and 1312 on map 1270. As shown in FIG. 8, in response to the further selection of crop rows 1304-4, controller 1240 retrieves stored information regarding the width of individual crop rows and outputs control signals causing display 1222 to depict the width of such crop rows in an enlarged or zoomed manner.

Figure 9:
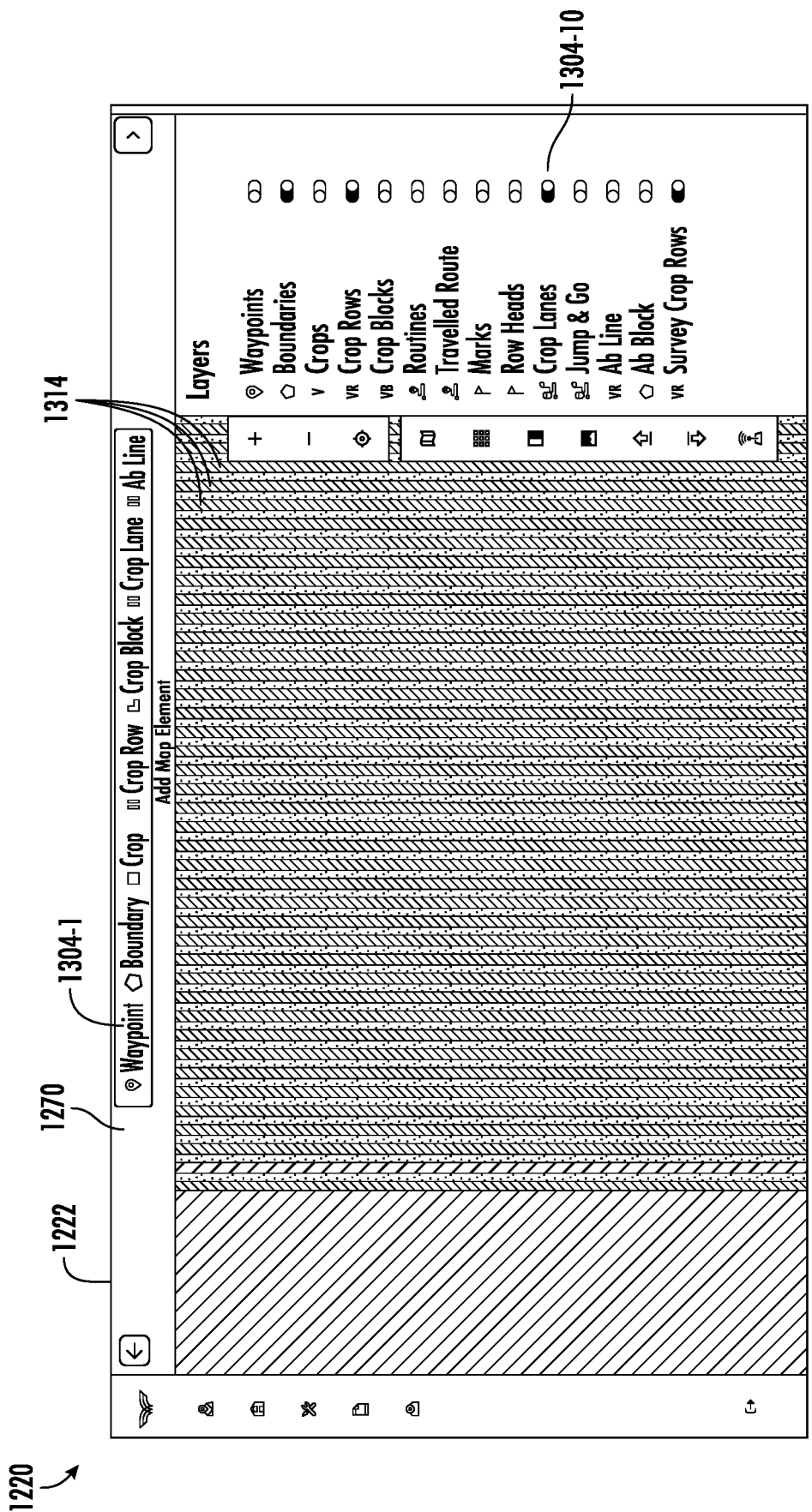
FIG. 9 is an example screenshot of the example mode of operation presented on the example display by the example mapping system of FIG. 5, the screenshot depicting an enlargement of a portion of the example satellite image with enlarged crop lanes, wherein the associated example menu of options are presented alongside the example satellite image.

As shown by FIG. 9, in response to user alternatively selecting crop lanes 1304-10, controller 1240 retrieves the geographic coordinates or dimensions and locations of the paths or crop lanes 1314 between the crop rows, and outputs control signals causing display 1222 to visually depict the available space between the crop rows for a vehicle (including any attached implement) to travel. In some implementations, the width of the crop lanes may vary depending upon an input or determined width of the vehicle and/or implement.

Selection of the "jump and go" icon 1304-11 allows a user to view on map 270 an individual session, wherein a session begins with a login and ends with a log out by the operator of the vehicle. During such sessions, operations performed are captured as part of the jump and go. By toggling it, the user may see the path taken by the vehicle/tractor.

Selection of the Ab line icon 1304-12 results in controller 1240 providing the user with an option to define, Mark and size or label a line on map 1270. The line may be established dragging of a cursor by mouse, a finger on a touchscreen or other input mechanism. The line may serve as an input path for subsequent autonomous navigation of a vehicle. Selection of the Ab block icon 1304-13 permits a user to input or identify/label a collection of Ab lines.

Figure 10:
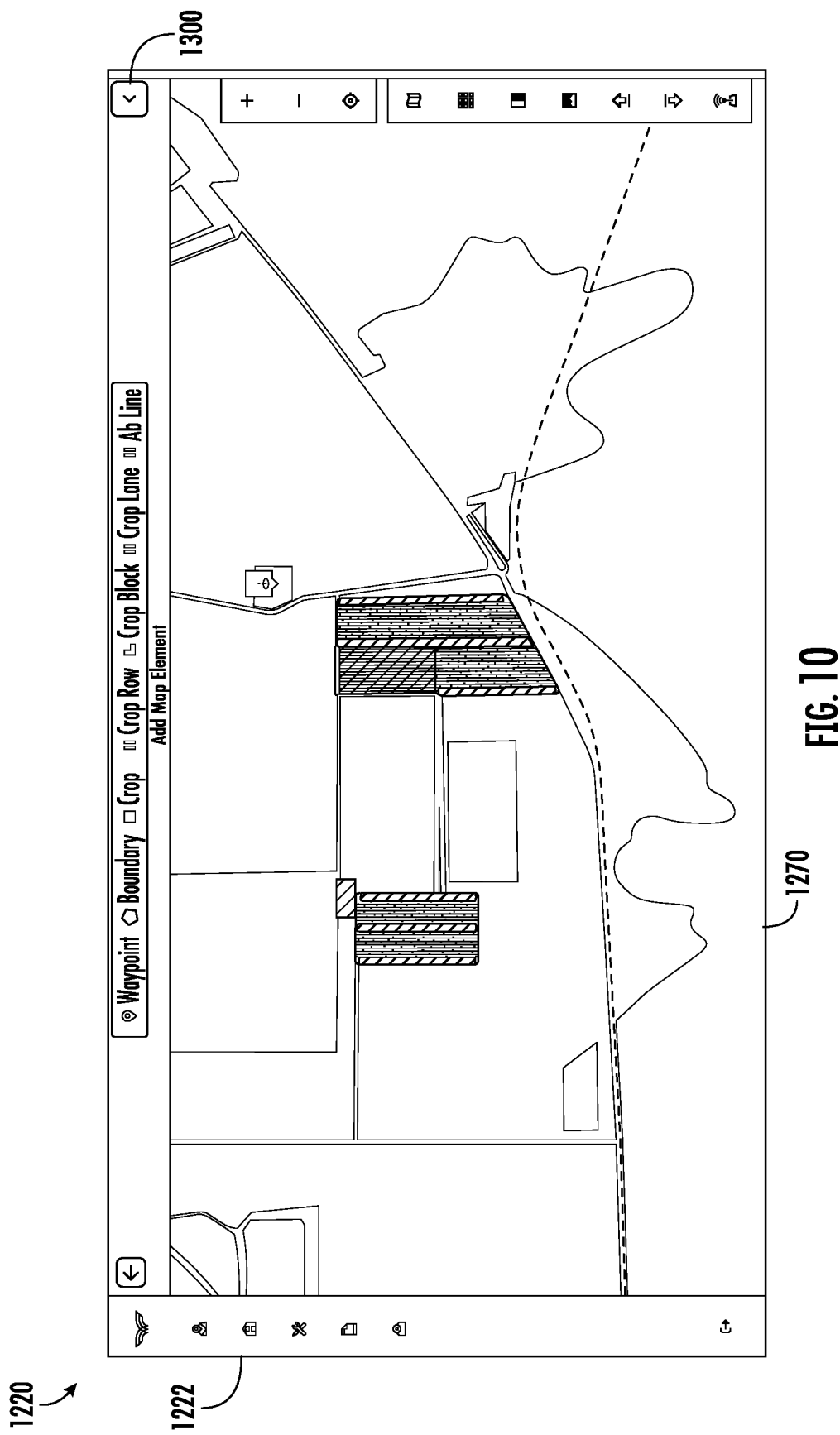
FIG. 10 is an example screenshot of the example mode of operation presented on the example display by the example mapping system of FIG. 5, the screenshot depicting an example road map image of the geographic region.

As shown in FIG. 10, system 1220 is configured to switch between a map in the form of a satellite image (a photographic map), as shown in FIGS. 18-23, or a map 1270 in the form of "road map" as shown in FIG. 10. Controller 1240 may toggle between the satellite image map 1270 (such as a GOOGLE satellite map) shown in FIGS. 19-23 or the road image map (normal, default 2D map in Google) shown in FIG. 10 in response to user selecting corresponding icons presented on display 1222. As shown in 18-23, controller 1240 may present various overlays on such maps to identify polygons/boundaries, crops, crop rows, or other information such as routines, the routes traveled by vehicles, marks, or the like.

Figure 11:
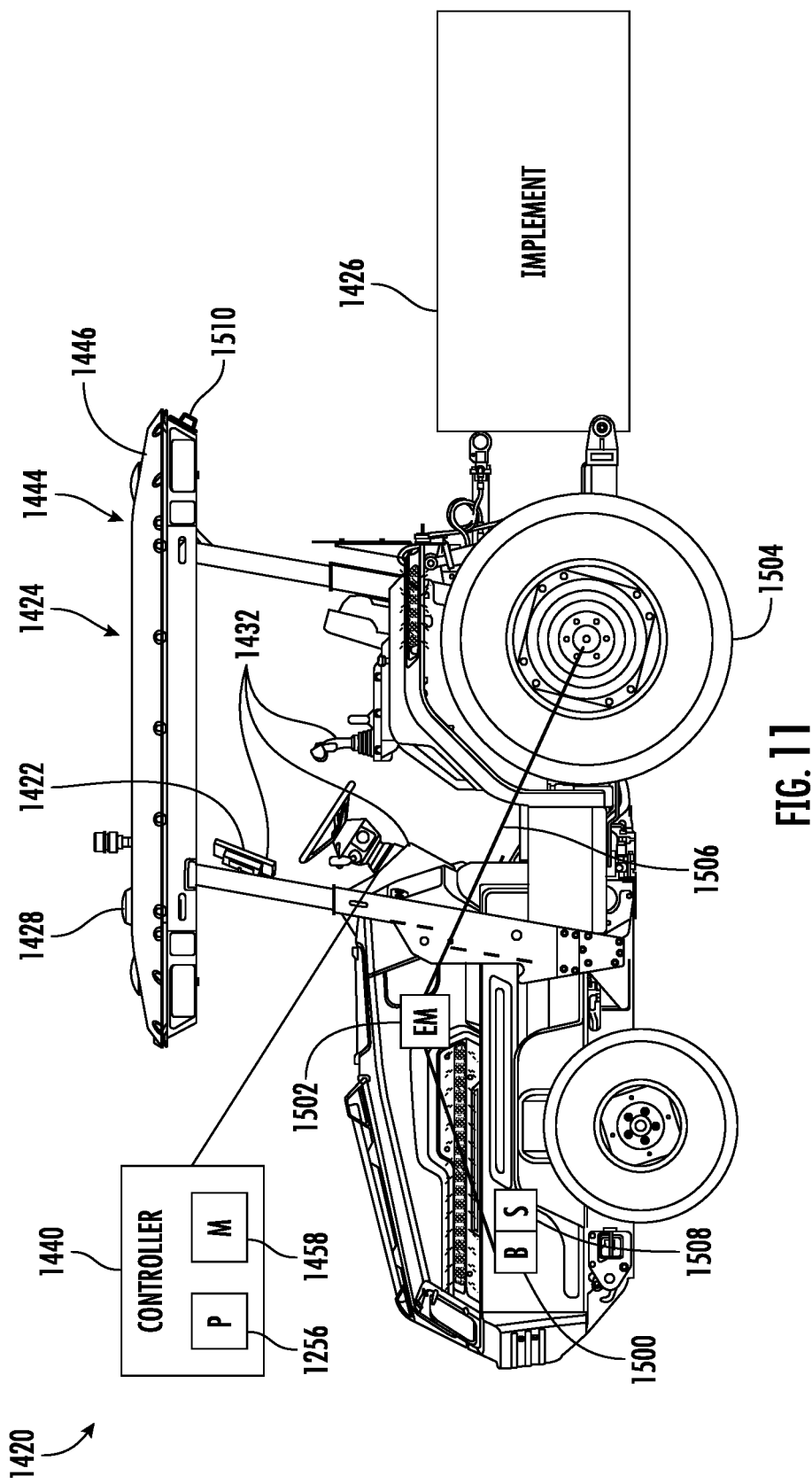
FIG. 11 is a side view illustrating portions of an example mapping system.

FIG. 11 is a side view illustrating portions of an example mapping system 1420. Mapping system 1420 is provided with respect to an example vehicle 1424 in the form of a tractor which is configured to carry, push or pull an example implement 1426 (schematically illustrated). In the example illustrated, vehicle 1424 comprises a battery 1500 which supplies electrical power to an electric motor 1502 which is operably coupled to driven traction members 1504 by a transmission 1506 so as to propel vehicle 1424. Vehicle 1424 further comprises a sensor 1508 to monitor the remaining electrical charge of battery 1500. In some implementations, sensor 1508 may be omitted. In some implementations, vehicle 1424 may comprise an internal combustion engine and a fuel tank containing fuel for the internal combustion engine to output torque for propelling rear traction members 1504 and vehicle 1424.

Mapping system 1420 comprises display 1422, sensor 1510, GPS system 1428, operator interface 1432 and controller 1440. Display 1422 may comprise a monitor or a touchscreen. In the example illustrated, display 1422 is supported within an operator cab 1444 of vehicle 1424. In other implementations, display 1422 may be at a remote location, such as where vehicle 1424 is remotely controlled or where autonomous operation of vehicle 1424 is remotely monitored or managed.

Sensor 1510 comprise a sensor outputs signals indicating characteristics of the type of implement 1426 currently attached to vehicle 1424. In the example illustrated, sensor 1510 comprises a rearwardly and downwardly facing camera supported by roof 1446 of operator cab 1444. Camera 1510 is configured to capture images of implement 1426, wherein controller 1440 may determine characteristics of the type of implement 1426 using segmentation or other image processing techniques. In some implementations, the type or characteristic of implement 1426 may be determined based upon input received from an operator via operator interface 1432.

GPS system 1428 is similar to GPS system 1228 described above. In the example illustrated, GPS system 1420 comprises at least one GPS antenna supported by a roof 1446 of operator cab 1444. Operator interface 1432 comprises one or more device by which an operator may receive information and/or provide input/instructions to controller 1440. In the example illustrated, operator interface 1432 may be in the form of a touchscreen associated with display 1422. Operator interface 4032 may further comprise a touchpad, mouse, joystick, slider bars, toggle switch, indicator lights or the like. As with display 1422, operator interface 1432 may reside on vehicle 1424 as shown and/or may reside at remote location, wherein operator interface 1432 wirelessly communicates with controller 1440.

Controller 1440 is similar to controller 1240 described above. In the example illustrated, controller 1440 comprises processing resource 1256 and medium 1458. Medium 1458 comprises instructions configured direct processing resource 1256 to perform analysis of data, and to output control signals controlling the operation of vehicle 1424 and the information presented on display 1422. Controller 1440 is configured to generate, store and display a map based upon various signals received from various sensors such as GPS system 1428, camera 1510, sensor 1508 and information received from operator interface 1432. Controller 1440 is configured to generate, store and display each of the maps described above with respect to FIGS. 1-10.

In the example illustrated, controller 1440 output maps which provide accurate and precise geographic coordinates for the individual plant rows of an agricultural region or for vehicle lanes between such plant rows. Controller 1440 identifies and determines such plant rows or vehicle lanes without the possibly burdensome task of manually identifying each individual row and without having to drive a vehicle between and along each and every plant row. As result, such maps may be generated at a lower cost and in less time.

In the example illustrated, mapping system 1420 identifies and maps geological and non-geological elements. Geological elements are those elements pertaining to the natural geological characteristics of the agricultural region such as bodies of water (including, but not limited to, wetlands, ponds, lakes, streams, creeks, rivers), sinkholes, mounds, boulders, undeveloped forested areas, trees, and the like. Non-geological elements are those elements that are temporary or that have their presence due to human activity. Example of non-geological elements include, but are not limited to, containers (such as harvest/crop, insecticide, herbicide, and fertilizer storage bins, silos, fuel tanks, and water tanks), vehicle electrical charging stations or fueling stations, and the like, buildings, pastures, roads, fence lines and the like.

Controller 1440 of mapping system 1420 is configured to receive input from an operator identifying and adding icons or other markings identifying the type and location of such geological and non-geological elements on the map. In some implementations, the example mapping systems, mediums and methods may receive or obtain an image of the agricultural region, such as from a satellite image or an aerial image, and use optical analysis or recognition (segmentation) to identify and classify geological and/or non-geological elements in the image, wherein the identified and classified geological and/or non-geological elements may then be added (either automatically or upon authorization/confirmation from a person) to the map. For example, in some implementations, controller 1440 may include or may access artificial intelligence, a neural network or machine learning may be used to automatically identify such elements in a received or obtained aerial or satellite image of the agricultural region, wherein the identification, classification and geographical coordinates of the identified elements are used to add icons or other representations of such elements at the appropriate locations in the map which correspond to the identified geographical locations of the elements.

In some modes, controller 1440 may overlay an image, such as a satellite image or an aerial image, of the agricultural region over or beneath the generated map. The geographical coordinates of points in the image may be aligned with corresponding geographical coordinates of points in the map. As result, the map, when displayed, may depict other geological and non-geologic elements which have not been specifically identified and classified.

In some modes, controller 1440 may apply area indicators to polygons so as to identify control or other characteristics of particular regions or areas. Such area indicators may be in the form of the line thickness of the polygon, the border style of the polygon, shading within the polygon, highlighting within or over the polygon, color, textual labels or other markings indicating control or other characteristics of the particular regions or areas bounded by the particular polygon.

For example, the map may comprise a first polygon defining an agricultural region and surrounding a series of parallel lines or bars which identify the geographic coordinates of plant rows or vehicle travel spaces. The map may further comprise a second polygon, at least partially surrounding the first polygon, wherein the second polygon outlines or defines a larger region that has or offers wireless communications capabilities for the vehicle and that may surround additional polygons that also include their respective series of parallel lines or bars (identifying plant rows or vehicle travel spaces). The map may further comprise a third polygon, at least partially containing the second polygon, wherein the third polygon outlines or defines the boundaries of ownership for land.

In some implementations, the area indicators may be applied to polygons so as to identify assignments to particular vehicle fueling or charging stations. For example, the map may include multiple polygons, each polygon (containing plant rows or vehicle travel spaces) being color-coded, shaded, labeled or otherwise marked so as to identify which of a plurality of charging stations are assigned to recharging a refueling the vehicle when operating in the agricultural region defined by the particular polygon. Such area indicators may inform a person operating the vehicle where to recharge or refuel the vehicle or may indicate to an automated controller or control system where the vehicle should be driven for refueling or recharging when carrying out operations in a particular agricultural region defined by a particular polygon. For example, a recommended charging station, given the current location of the vehicle, may be highlighted by a particular color, brightness or flashing on the displayed map. In some implementations, the vehicle the controller configured to: (1) determine a remaining battery or fuel charge; (2) identify a charging station or refueling station for the vehicle based upon the remaining battery charge; and (3) output control signals causing the display to indicate a location of the charging station/refueling station on the map.

In some implementations, the area indicators may be applied to polygons so as to identify the type of plants growing in a particular agricultural region and/or a particular growth stage or condition of the plants in a particular agricultural region. The area indicators may be applied to polygons to indicate at least one prior completed operation, a currently ongoing operation or an operation scheduled to be performed in an agricultural region of the particular polygon. The polygons may be color-coded, shaded, provided with particular border styles, highlighted, labeled or otherwise marked to indicate such information. Such information may be automatically generated and applied to the map or may be applied in response to information received from an operator via an operator interface. In some implementations, such information may be determined or derived in an automated fashion by machine learning, optical analysis or the like using satellite images, aerial images or images acquired from cameras carried by vehicle.

In some implementations, controller 1440 may apply the area indicators to polygons so as to identify assignments to particular vehicle fueling or charging stations. For example, the map may include multiple polygons, each polygon (containing plant rows or vehicle travel spaces) being color-coded, shaded, labeled or otherwise marked so as to identify which of a plurality of charging stations are assigned to recharging a refueling the vehicle when operating in the agricultural region defined by the particular polygon. Such area indicators may inform a person operating the vehicle where to recharge or refuel the vehicle or may indicate to an automated controller or control system where the vehicle should be driven for refueling or recharging when carrying out operations in a particular agricultural region defined by a particular polygon. For example, a recommended charging station, given the current location of the vehicle, may be highlighted by a particular color, brightness or flashing on the displayed map. In some implementations, the vehicle the controller configured to: (1) determine a remaining battery or fuel charge; (2) identify a charging station or refueling station for the vehicle based upon the remaining battery charge; and (3) output control signals causing the display to indicate a location of the charging station/refueling station on the map.

In some implementations, the area indicators may be applied to polygons so as to identify the type of plants growing in a particular agricultural region and/or a particular growth stage or condition of the plants in a particular agricultural region. The area indicators may be applied to polygons to indicate at least one prior completed operation, a currently ongoing operation or an operation scheduled to be performed in an agricultural region of the particular polygon. The polygons may be color-coded, shaded, provided with particular border styles, highlighted, labeled or otherwise marked to indicate such information. Such information may be automatically generated and applied to the map or may be applied in response to information received from an operator via an operator interface 1432. In some implementations, such information may be determined or derived in an automated fashion by machine learning, optical analysis or the like using satellite images, aerial images or images acquired from cameras, such as sensor 1510 in the form of a camera carried by vehicle 1424.

In some implementations, the area indicators may be applied to polygons so as to identify or designate the level of automation that may be utilized when performing operations on agricultural region defined by the polygon. For example, the first polygon may have a first applied area indicator which indicates that the vehicle must be operated manually (a manual mode) when performing operations in the region. A second polygon may have a second applied area indicator indicating that the vehicle may be operating in one or more of a manual, copycat, follow me or auto drive mode.

In some implementations, the area indicator may be applied to polygons so as to designate a selected type of vehicle control to be performed or utilized on the agricultural region defined by the polygon. For example, a controller 1440/operator may determine that a vehicle performing an operation in the first region defined by a first polygon should be controlled manually. The controller/operator may decide to determine that the vehicle performing an operation in a second region defined by a second polygon should be controlled in an automated fashion (auto drive) the controller are permitted determine or decide that vehicle performing operations in a third region defined by a third polygon should be controlled using a copycat or follow me mode. Each of the different modes may be designated by a different distinct area indicator applied to each polygon. Such designations may assist a manager or automated controller in assigning vehicles and personnel to different agricultural regions for different operations.

In some implementations, the area indicators may indicate limitations or designations for particular types of equipment that may be or are to be used in an agricultural region defined by a particular polygon. For example, a first agricultural region defined by first polygon may have an area indicator which indicates that only vehicles up to a particular weight, wheelbase, horsepower, size, and/or functional capability are to be used in the particular agricultural region. Other area indicators may indicate that only vehicles above a particular weight, wheelbase, horsepower, size and/or functional capability are to be used in a particular agricultural region. Some area indicators may identify minimum or maximum sizes or capabilities for the agricultural implements or attachments being utilized in the particular agricultural region. Such information may be automatically determined by an automated controller or may be received from a manager or operator via an operator interface. Such area indicators may provide assistance to a manager or automated control when assigning or delegating tasks to different equipment and personnel for different agricultural regions defined by different polygons. In some implementations, the vehicle may comprise a tractor attached to an implement. In such implementations, the controller may be further configured to: (1) determine a type or characteristic of the implement; (2) determine selected regions based upon the type or the characteristic of the implement; and (3) output control signals causing the display to indicate the selected regions.

Figure 12:
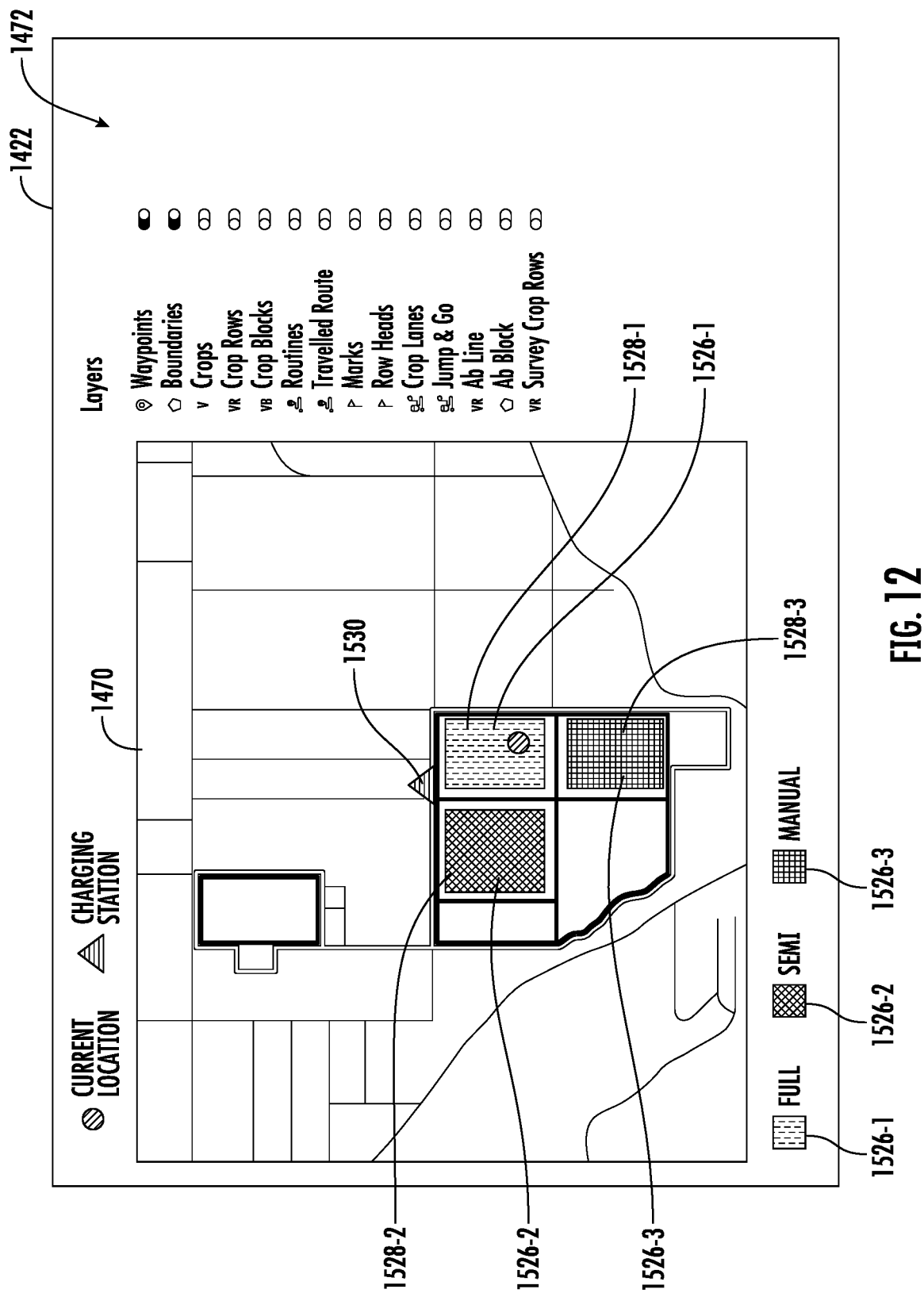
FIG. 12 is a diagram illustrating an example map and input/legend presented by a display of the mapping system of FIG. 11.

FIG. 12 illustrates an example map 1470 along with an associated operator interface/legend 1472 on display 1422. The operator interface/legend 1472 is partially described above with respect to FIGS. 5-10 and provide information to the operator as well as a graphical user interface by which the operator may make selections for what information is currently being displayed on map 1470.

As shown by FIG. 12, controller 1440 may output control signals causing display 1422 to present an icon or other graphical representation serving as a vehicle location indicator 1520 indicating the current location of vehicle 1424 with respect to the depicted map 1470. As of vehicle 1424 traverses the geographical region depicted by map 1470, the vehicle location indicator 1520 will also correspondingly move on the map 1470, providing the operator with an up-to-date are up to minute information regarding the current location of vehicle 1424.

As shown by FIG. 12, controller 1440 may output control signals causing display 1422 to provide area indicators 1526-1, 1526-2 and 1526-3 on map 1470 which indicate the level of autonomy recommended for a particular geographic region depicted on map 1470. In the example illustrated, controller 1440 is identifying or designating full autonomous, semi-autonomous and manual levels of automation for when operations are performed on agricultural regions 1528-1, 1528-2 and 1528-3, respectively. A semi-autonomous mode may be a mode where certain operations are automated and certain operations are manually performed. A semi-autonomous mode may be a mode where operations are autonomously performed, but where periodic or continuous operator monitoring or input is required. In other implementations, additional autonomous levels or modes may be indicated by area indicators output by controller 1440 on map 1470.

In some implementations, the area indicators indicating the level autonomy recommended or mandated for particular regions by controller 1440 may vary depending upon additional factors provided to controller 1440, such as the type or characteristic of implement 1426, the current operation being performed by vehicle 1424/implement 1426 or environmental conditions such as soil condition/moisture, weather conditions, temperature, time of day (night or daytime) and the like. Controller 1440 may determine the type or characteristic of 1426 based on signals from sensor 1510. Controller 1440 may determine such factors based upon input from an operator via operator interface 1432.

In the example illustrated, controller 1440 is further configured to identify which of a plurality of charging stations are assigned to recharging a refueling the vehicle when operating in the agricultural region defined by the particular polygon. In the example illustrated, controller 1440s outputting control signals causing display 1422 to present a charging station location indicator 1530 on map 1470. Charging station location indicator 1530 may inform a person operating the vehicle where to recharge or refuel the vehicle or may indicate to an automated controller or control system where the vehicle should be driven for refueling or recharging when carrying out operations in a particular agricultural region defined by a particular polygon. The recommended charging station, given the current location of the vehicle 1424, may be highlighted by a particular color, brightness or flashing on the displayed map 1470.

In some implementations, controller 1440 may select and depict charging stations based upon the current location of vehicle 1424 and the current state of charge of battery 1500 and/or the rate of consumption of electrical power from battery 1500 by vehicle 1424. Controller 1440 may determine the current state of charge of battery 1500 based on signals from sensor 1508 and such or may determine the rate of consumption of electrical charge based upon signals from sensor 1508. Based upon such data, controller 1440 may determine the remaining life of battery 1500 and may recommend a particular charging station location by depicting a particular charging station location indicator 1530 on map 1470. In some implementations, indicator 1530 may change color or maybe flashing indents is where the level charging battery 1500 is sufficiently low so as to satisfy a predetermined recharging recommendation threshold.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A mapping system comprising:
   a display;
   a global positioning satellite (GPS) system to be carried by a vehicle; and
   a controller configured to:
      determine a polygon representing a geographic boundary of a first region based on signals received from the GPS system of the vehicle as the vehicle travels to enclose the first region; and
      estimate geographic coordinates of a first number of consecutive rows within the polygon based on signals from the GPS system of the vehicle as the vehicle travels between a second number of consecutive rows less than the first number of consecutive rows; and
      output control signals causing the display to present a map comprising the polygon and lines within the polygon, the lines being based on the estimated geographic coordinates of the first number of consecutive rows, wherein the lines represent plant rows or paths between plant rows.

2. The mapping system of claim 1 further comprising an operator interface configured to receive characteristics for the region represented by the polygon, wherein the controller is configured to output control signals causing the display to indicate the received characteristics for the region.

3. The mapping system of claim 1, wherein the controller is configured to:
receive an image of the region;
identify and classify an element in the image of the region; and
output control signals causing the display to present an indication of a classification of the element on the map.

4. The mapping system of claim 3, wherein the element is selected from a group of elements consisting of: a road; a container; and a body of water.

5. The mapping system of claim 1, wherein the controller is configured output control signals causing the display to present a depiction of a vehicle charging station on the map.

6. The mapping system of claim 1 further comprising an operator interface, wherein the controller is further configured to receive input from an operator causing the controller to output control signals adding an element to the map.

7. The mapping system of claim 1, wherein the controller is further configured to output control signals causing the display to present with the map an indication of a type of vehicle control for a vehicle traveling within the region.

8. The mapping system of claim 1, wherein the controller is further configured to:
determine a second polygon representing a geographic boundary of a second region containing the first region and based on signals received from the GPS system of the vehicle as the vehicle travels to enclose the second region; and
output control signals causing the display to present the second polygon on the map.

9. The mapping system of claim 1, wherein the controller is configured to output control signals causing the display to overlay the map on an image of the region.

10. The mapping system of claim 1, wherein the controller is configured to output control signals causing the display to indicate an operation previously performed on, currently being performed on or scheduled to be performed on the region.

11. The mapping system of claim 1, wherein the controller is configured to output control signals causing display to depict a representation of a current location of the vehicle on the map based upon signals received from the GPS system.

12. The mapping system of claim 1 further comprising an operator interface configured to receive an input from an operator indicating a row spacing, wherein the controller is configured to estimate the geographic coordinates of the first number of consecutive rows within the polygon based on signals from the GPS system of the vehicle as the vehicle travels between the second number of consecutive rows less than the first number of consecutive rows and additionally based upon the row spacing.

13. The mapping system of claim 12, wherein the second number of consecutive rows consists of a single pair of consecutive rows.

14. The mapping system of claim 1, wherein the second number of consecutive rows consists of first, second and third consecutive rows and wherein the controller is configured to estimate the geographic coordinates of the first number consecutive rows within the polygon based on signals from the GPS system of the vehicle as the vehicle travels between the first and second consecutive rows and travels between the second and third consecutive rows.

15. The mapping system of claim 1, wherein the vehicle comprises a battery supplying electrical power for propelling the vehicle and wherein the controller is further configured to:
determine a remaining battery charge;
identify a charging station for the vehicle based upon the remaining battery charge; and
output control signals causing the display to indicate a location of the charging station on the map.

16. The mapping system of claim 1, wherein the vehicle comprises a battery supplying electrical power for propelling the vehicle and wherein the controller is further configured to:
determine a particular charging station assigned to the vehicle for recharging the battery based upon a current location of the vehicle; and
output control signals causing the display to indicate a location of the particular charging station on the map.

17. The mapping system of claim 1, wherein the vehicle comprises a tractor attached to an implement and wherein the controller is further configured to:
determine a type or characteristic of the implement;
determine selected regions based upon the type or the characteristic of the implement; and
output control signals causing the display to indicate the selected regions.

18. The mapping system of claim 1, wherein the controller is further configured to:
determine a level of automation for the vehicle for a particular region; and
output control signals causing the display to indicate the level of automation for the vehicle for the particular region.

19. The mapping system of claim 18, wherein the level of automation for a particular region is determined based upon a type of operation to be performed in the particular region.

20. A non-transitory computer-readable medium containing instructions to a direct the processor to:
determine a polygon representing a geographic boundary of a first region based on signals received from the GPS system of a vehicle as the vehicle travels to enclose the first region; and
estimating geographic coordinates of a first number consecutive rows within the polygon based on signals from the GPS system of the vehicle as the vehicle travels between a second number of consecutive rows less than the first number of consecutive rows; and
output control signals causing the display to present a map comprising the polygon and lines within the polygon, the lines being based on the estimated geographic coordinates of the first number of consecutive rows.

* * * * *